US008725306B2

(12) United States Patent
Ramezani et al.

(10) Patent No.: US 8,725,306 B2
(45) Date of Patent: May 13, 2014

(54) VEHICLE ELECTRIC CHARGING SCHEDULE SELECTION AND EVOLUTION BASED ON MULTIPLE WEIGHTED CHARGING OBJECTIVES

(75) Inventors: Maryam Ramezani, Walldorf (DE); Harald Vogt, Karlsruhe (DE); Mario Graf, Achern (DE); Heinrich Braun, Walldorf (DE)

(73) Assignee: SAP AG, Walldorf (DE)

( * ) Notice: Subject to any disclaimer, the term of this patent is extended or adjusted under 35 U.S.C. 154(b) by 445 days.

(21) Appl. No.: 13/220,578

(22) Filed: Aug. 29, 2011

(65) Prior Publication Data
US 2013/0054045 A1    Feb. 28, 2013

(51) Int. Cl.
*G05D 11/00*    (2006.01)

(52) U.S. Cl.
USPC ................. 700/297; 701/123; 320/109

(58) Field of Classification Search
USPC ................. 700/297; 701/123; 320/109
See application file for complete search history.

(56) References Cited

U.S. PATENT DOCUMENTS

| 8,548,660 | B2 * | 10/2013 | Thai-Tang et al. | 701/22 |
| 2008/0119965 | A1 * | 5/2008 | McCrary | 701/2 |
| 2008/0119982 | A1 * | 5/2008 | Yamada | 701/35 |
| 2009/0139781 | A1 * | 6/2009 | Straubel | 180/65.1 |
| 2009/0259354 | A1 * | 10/2009 | Krupadanam et al. | 701/22 |
| 2010/0017249 | A1 * | 1/2010 | Fincham et al. | 705/8 |
| 2010/0106401 | A1 * | 4/2010 | Naito et al. | 701/201 |
| 2011/0047052 | A1 * | 2/2011 | Cornish | 705/30 |
| 2011/0140656 | A1 * | 6/2011 | Starr et al. | 320/109 |
| 2011/0202216 | A1 * | 8/2011 | Thai-Tang et al. | 701/22 |
| 2011/0202221 | A1 * | 8/2011 | Sobue et al. | 701/22 |
| 2011/0246252 | A1 * | 10/2011 | Uesugi | 705/7.12 |
| 2011/0313652 | A1 * | 12/2011 | Hancock | 701/201 |

OTHER PUBLICATIONS

Markel, et al, "Communication and Control of Electric Vehicles Supporting Renewables", National Renewable Energy Laboratory, Conference Paper, NREL/CP-540-46224, Aug. 2009, 11 pages.
Gao, et al, "Design and Control Methodology of Plug-in Hybrid Electric Vehicles", IEEE Transactions on Industrial Electronics, vol. 57, No. 2, Feb. 2010, pp. 633-640.
Hartmann, et al, "Impact of different utilization scenarios of electric vehicles on the German grid in 2030", Journal of Power Sources, doi:10.1016/j.jpowersour.2010.09.117, Sep. 2010, 43 pages.
Putrus, et al, "Impact of Electric Vehicles on Power Distribution Networks", IEEE Vehicle Power and Propulsion Converence, 2009, 5 pages.

(Continued)

*Primary Examiner* — Mohammad Ali
*Assistant Examiner* — Anthony Whittington
(74) *Attorney, Agent, or Firm* — Brake Hughes Bellermann LLP

(57) ABSTRACT

The present description refers to a computer implemented method, computer program product, and computer system to determine a plurality of electric charging schedules for one or more electric vehicles, determine, for each of the electric charging schedules, a plurality of charging objective values, assign a weight to each of the charging objective values, wherein one set of weights is used for the plurality of electric charging schedules, calculate a fitness value for each of the electric charging schedules based on the plurality of charging objective values for each respective electric charging schedule and the set of weights, identify the electric charging schedule having a highest fitness value, and select the electric charging schedule having the highest fitness value for charging one or more electric vehicles.

20 Claims, 6 Drawing Sheets

(56) References Cited

OTHER PUBLICATIONS

Mets, et al, "Optimizing Smart Energy Control Strategies for Plug-In Hybrid Electric Vehicle Charging", 12th IEEE/IFIP Network Operations and Management Symposium, 2010, 7 pages.

Clement-Nyns, et al, "The Impact of Charging Plug-In Hybrid Electric Vehicles on a Residential Distribution Grid", IEEE Transactions on Power Systems, vol. 25, No. 1, Feb. 2010, pp. 371-380.

* cited by examiner

VEHICLE ELECTRIC CHARGING SCHEDULE SELECTION AND EVOLUTION BASED ON MULTIPLE WEIGHTED CHARGING OBJECTIVES

TECHNICAL FIELD

This description is directed generally to the charging of electric vehicles, and in particular, to a computer-implemented method, apparatus, and computer program product related to vehicle charging schedule selection and evolution based on multiple weighted charging objectives.

BACKGROUND

In the last decades, due to emission reduction policies, researchers have focused on developing large-scale sustainable energy systems. Among those, researchers studied approaches to support integration of electric vehicles into the power grid. Integration of electric vehicles (EVs) into the power grid is important to reduce $CO_2$ emissions in the transport sector. Electric vehicles, while reducing $CO_2$ emissions, can put significant stress on sections of the distribution grid while charging. Uncoordinated charging of batteries of electric vehicles can have considerable impact on the performance of the distribution grid in terms of power losses and power quality.

SUMMARY

In one general aspect, a computer program product is provided. The computer program product is tangibly embodied on a computer-readable storage medium and includes executable code that, when executed, is configured to cause at least one data processing apparatus to: determine a plurality of electric charging schedules for one or more electric vehicles, determine, for each of the electric charging schedules, a plurality of charging objective values, and assign a weight to each of the charging objective values, wherein one set of weights is used for the plurality of electric charging schedules. The code is further configured to cause the data processing apparatus to calculate a fitness value for each of the electric charging schedules based on the plurality of charging objective values for each respective electric charging schedule and the set of weights, identify the electric charging schedule having a highest fitness value, and select the electric charging schedule having the highest fitness value for charging one or more electric vehicles.

In another general aspect, a computer implemented method is provided that includes determining a plurality of electric charging schedules for one or more electric vehicles, determining, for each of the electric charging schedules, a plurality of charging objective values, assigning a weight to each of the charging objective values, wherein one set of weights is used for the plurality of electric charging schedules, and calculating a fitness value for each of the electric charging schedules based on the plurality of charging objective values for each respective electric charging schedule and the set of weights. The computer implemented method further includes identifying the electric charging schedule having a highest fitness value, and selecting the electric charging schedule having the highest fitness value for charging one or more electric vehicles.

In another general aspect, an apparatus includes a scheduling logic configured to determine a plurality of electric charging schedules for one or more electric vehicles, charging objective value determination logic configured to determine, for each of the electric charging schedules, a plurality of charging objective values, weight assignment logic configured to assigning a weight to each of the charging objective values, wherein one set of weights is used for the plurality of electric charging schedules, and fitness value logic configured to calculate a fitness value for each of the electric charging schedules based on the plurality of charging objective values for each respective electric charging schedule and the set of weights. The apparatus also includes a comparator configured to identify the electric charging schedule having a highest fitness value, and selection logic configured to select the electric charging schedule having the highest fitness value for charging one or more electric vehicles.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described herein.

In addition, the subject matter described herein may also be implemented as a system including a processor and a memory coupled to the processor. The memory may encode one or more programs that cause the processor to perform one or more of the method acts described in this specification.

The details of one or more implementations are set forth in the accompanying drawings and the description below. Other features will be apparent from the description and drawings, and from the claims.

DETAILED DESCRIPTION

Figure 1:
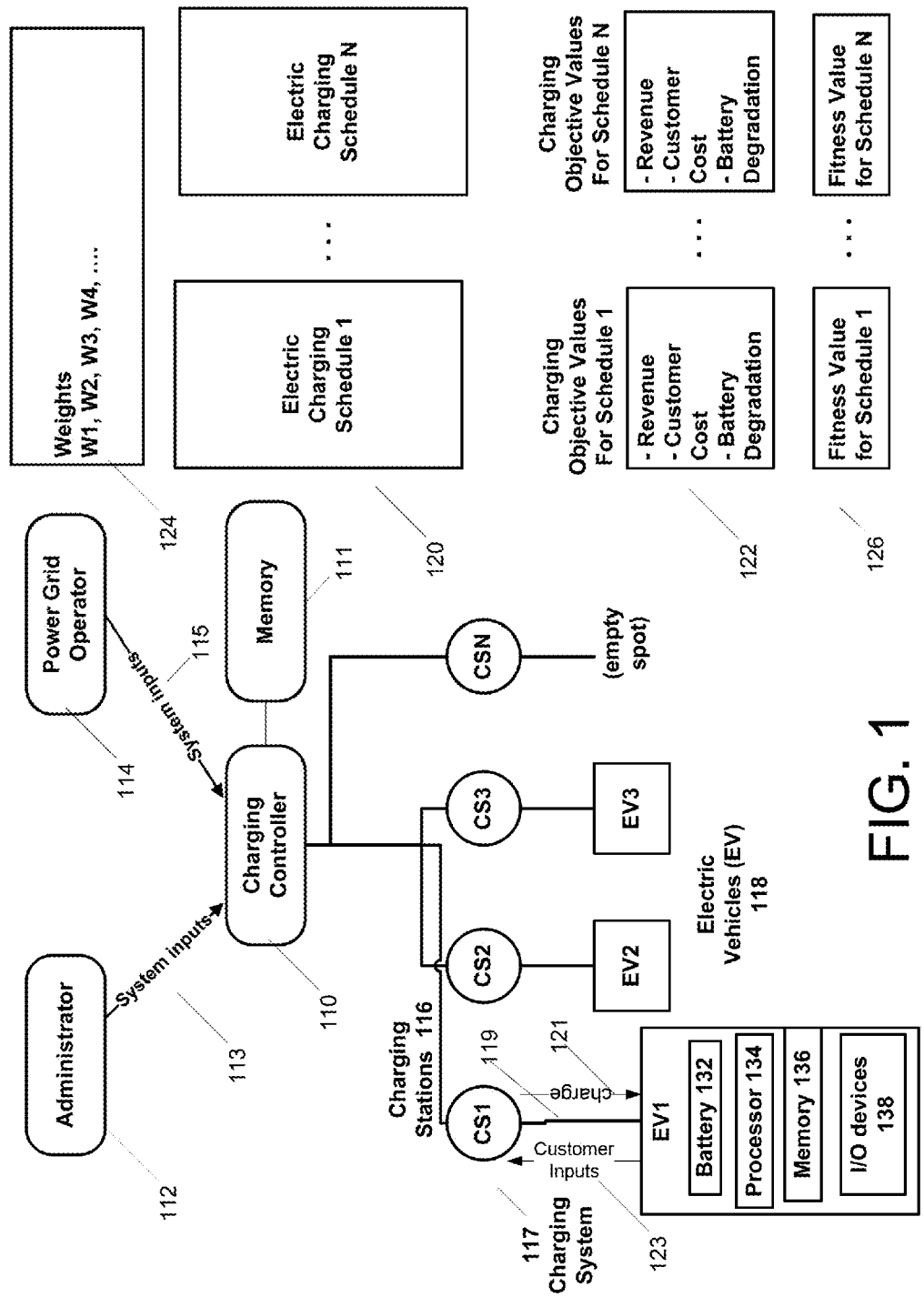
FIG. 1 is a block diagram illustrating an exemplary system for selecting an electric charging schedule for charging one or more electric vehicles.

In the following, a detailed description of examples will be given with reference to the drawings. It should be understood that various modifications to the examples may be made. In particular, elements of one example may be combined and used in other examples to form new examples.

According to one example implementation, a charging controller 110 may employ a multi-objective evolutionary algorithm to derive an optimized, or at least selected, schedule for charging of batteries of electric vehicles based on several tunable or weighted charging objectives. In an example implementation, a charging schedule may specify charging times, e.g., a start time and end time for charging, a charge current or charge curve, a charge amount, and/or other parameters for the charging of one or more batteries of electric vehicles.

A charging service provider may consider a number of different objectives in determining an electric charging schedule or in developing a scheduling strategy. Some example objectives for charging electric vehicles may include: 1) maximizing revenue or profit of the charging service provider, 2) minimizing customer cost of the charging services, 3) minimizing battery degradation of the vehicle battery, 4) maximizing use of renewable energy resources in providing charging services, 5) minimizing charging time for charging a electric vehicle/battery), 6) providing charging services within any power grid requirements or constraints, such as not exceeding a grid capacity, or 7) by allowing temporary storage of charge or power on batteries that are being charged and selling this power back to the power grid or power company during periods of high demand, e.g., vehicle to grid power transfer. These are merely some example objectives related to providing electric charging services, and many other objectives may be used. In some situations, some of these charging objectives may be, at least to a certain degree, inconsistent with each other. For example, the objective of maximizing profit or revenue of the charging service provider may, at least for some situations, conflict with the objective of minimizing consumer cost of charging services.

A charging service provider may provide charging services to one or more electric vehicles. Different types of charging service providers may be provided. For example, there may be at least two classes of charging service providers, such as 1) public charging service providers, and 2) private charging service providers. Public charging service providers may provide electric battery charging services, e.g., to the public, for a fee and operate for profit, and may be located at a parking garage or parking lot, a shopping mall, an airport, or other public location. Therefore, some example objectives of a public charging service provider may include maximizing profit and/or charging as many vehicles as quickly as possible.

Even within the public (or commercial) charging service providers, each provider may have different circumstances. For example, a charging service provider at a shopping mall may only have, on average, about 2-4 hours to charge a vehicle. While a charging service provider at a parking garage may have around 8 hours on average to charge vehicles. Thus, different charging schedules might be appropriate for these two different types of charging service providers.

On the other hand, a private charging service provider may be provided for a private entity, such as for a group of apartment or condo owners at an apartment complex, a private home, or a corporate or privately owned parking lot or garage where a company or individual may own a fleet of electric vehicles that are charged on daily or periodic basis. At a private charging service, some main charging objectives may be, for example, to minimize customer cost (e.g., provide charging services for a relatively low cost to employees, homeowners, etc.) and/or to minimize battery degradation so as to increase the lifespan of batteries in a fleet of electric vehicles. Therefore, each of these service providers may have different charging objectives.

One or more of the example implementations may provide a solution that provides or identifies a charging schedule (e.g., optimized or most suitable or best charging schedule) for different environments or for different types of charging service providers based on a set of weighted charging objective values, where each schedule may have its own set of charging objective values. A set of weights may be received from a user or administrator, for example. The weights may be adjusted to emphasize some electric charging objectives, while de-emphasizing other charging objectives, depending on the needs of the charging service provider. In this manner, these techniques may be used to identify an optimized charging schedule, e.g., identify a charging schedule that is tailored to the weighted or tuned objectives of the charging service provider.

According to an example implementation, a plurality of electric charging schedules are determined. A plurality of charging objective values are determined for each charging schedule. A set of weights are received for the group of schedules, where a weight is assigned to or associated with each of the charging objective values. A fitness value is then calculated for each charging schedule based on the weights and the charging objective values for each schedule. A charging schedule having a highest fitness value is identified from among a group of charging schedules. The electric charging schedule having the highest fitness value is selected for charging one or more electric vehicles. The charging schedule having a best or highest fitness value may best meet the charging objectives emphasized by the charging service provider, as indicated by the weights. One or more vehicles are then charged in accordance with the selected charging schedule.

In addition, an algorithm for improvement of the charging schedules may be used, such as evolutionary optimization, in order to generate new charging schedules based on one or more existing charging schedules. A set of charging objective values and a fitness value is calculated for each of the new charging schedules, and a (new) charging schedule is selected having a highest or best fitness value.

FIG. 1 is a block diagram illustrating an exemplary system for selecting an electric charging schedule for charging one or more electric vehicles. A charging controller 110 provides overall control of the various aspects related to electric charging, including control of schedule generation, the improvement or evolutionary optimization of electric charging schedules, electric charging schedule selection, and charging of electric vehicles based on a selected charging schedule.

A memory 111 is coupled to charging controller 110 and may store data, computer instructions, and/or other information. Charging controller 110 may receive one or more system inputs via line 113 from a (e.g., local) system administrator. Examples of local system inputs from an administrator, which may be stored in memory 111, may include a, maximum number of vehicles that may be charged by charging system 117, the maximum amount of current that may be provided to each vehicle/battery during charging, a customer cost for charge for each customer or user, e.g., $/KWh, since the charge may be different for each customer, and other local system inputs. The cost for unit charge e.g., $/KWh, may be fixed, or may vary over time. For example, a customer may be charged a higher rate during peak demand periods, and lower rates during hours of lower demand.

Charge controller 110 may also receive one or more system inputs via line 115, e.g., from a power grid operator 114. Example system inputs from a grid operator or power company may include, for example, a power grid capacity or maximum amount of current or power that may be applied at one time by this charging service provider, which may be a hard constraint, or may be a soft constraint that may be exceeded with a financial or monetary penalty, a procurement cost for electric charge, which may be the wholesale cost of electric charge purchased by the charging service provided from the power grid operator or power company. The procurement cost for charge may be a fixed price, or may vary or change from day to day, or may vary more dynamically, e.g., every minute based on the cost of power, overall power/charge demand, availability of renewable or less expensive power or charge sources, such as solar power or wind power, etc. Thus, charge or power procurement costs may be higher, for example, during the day when demand is highest, and may be lower from 12 am-5 am when demand may be lower, although this is just an example. System inputs from a grid operator 114 may also include a cost penalty for exceeding a grid capacity for the charging service provider.

A charging system 117 may include one or more charging stations 116 which may include charging stations CS1, CS2, CS3, and . . . CSN. An electric vehicle (EV) 118 may be electrically connected to each charging station (CS) 116 to allow the battery of the vehicle 118 to be electrically charged according to a selected electric charging schedule. For example, electric vehicle EV1 is connected to charging station CS1, electric vehicle EV2 is connected to charging station CS2, electric vehicle EV3 is connected to charging station CS3, etc., as shown in FIG. 1.

In an example implementation, each charging station (CS) 116 may include a cable 119 and an electrical receptacle or connector for connecting to an electric vehicle (EV) 118 to allow the vehicle's battery to be charged from a power grid via the charging controller 110 through a respective charging station (CS) 116, as shown by line 121. In an example implementation, the cable 119 may also include a communications link to allow for two-way communication between each electric vehicle (EV) 118 and the charging controller 110 via the respective charging station (CS) 116, for example. Alternatively, each electric vehicle 118 may communicate wirelessly with charging controller 110, for example.

As an example, electric vehicle EV1 may include a battery 132 to be charged, a processor 134, a memory 136, and one or more input/output (I/O) devices 138 such as a keypad, display, pointing device, etc. Although not shown, the other vehicles EV2, EV3, . . . may similarly include a battery, a processor, a memory, and I/O devices. In an example implementation, processor 134, memory 136 and I/O devices 138 may be provided as part of a vehicle's on-board computer system, navigation system, or may be a user's cell phone, laptop or other computing device that may be connected to the charging station CS1, as examples. As shown by line 123, one or more user inputs may be communicated from electric vehicle EV1, or from processor 134 of EV1, to charging controller 110 via a communications link provided through cable 119 and charging station CS1, or other communications link.

One or more user or customer inputs may be input by a user or customer via I/O devices 138 (e.g., keypad), or retrieved from memory 136 of vehicle EV1, and output to charging controller 110. For example, user inputs may include: 1) a charging end time or vehicle departure time, 2) a requested charge amount, such as a percent charged (e.g., 80% charged), and various vehicle or battery-specific constraints or parameters, such as, for example: 3) a minimum and maximum battery charge amount, 4) a maximum battery charge current, e.g., in which a charge current greater than this maximum battery charge current may likely damage or degrade battery 132, 5) whether or not discontinuous battery charging may be used for battery 132, etc. User inputs 3)-5) are battery-specific and may be stored in memory 134 and automatically retrieved and provided to charging controller 110 upon connection of vehicle EV1 to CS1, for example.

As shown in FIG. 1, various information may be stored in memory 111 such as one or more weights 124 which may include weights W1, W2, W3, W4, etc. One or more electric charging schedules 120 may also be stored in memory 111 that may identify the charging time(s), charging currents (or charging curves identifying a changing charge current), and/or other parameters related to charging of batteries for one or more electric vehicles. Charging objective values 122 and a fitness value 126 may be determined or calculated for each charging schedule and stored in memory 111.

According to an example implementation, a fitness value may be calculated for each of a plurality of electric charging schedules. A charging schedule having a highest fitness value may be selected and used to charge one or more electric vehicles. A fitness value may be calculated for each of a plurality of electric charging schedules based on the plurality of charging objective values and a set of weights, According to an example implementation, a fitness value for a charging schedule may be calculated as a linear aggregation or sum of weighted charging objective values. A set of weights W1, W2, W3 and W4 may be set or initialized by a user, administrator, etc., to emphasize certain charging objectives, and to de-emphasize other charging objectives. A weight may be associated with each of the charging objective values. For example, a user may select a higher first weight to emphasize an associated charging objective, and use a lower second weight to de-emphasize another charging objective in the selection of an electric charging schedule.

A fitness value for an electric charging schedule may be calculated as a linear aggregation or sum of weighted charging objective values, as shown by the example of Eqn. 1 below.

$$\text{Fitness value} = W1 \times R - W2 \times \Sigma_1^n C(i) - W3 \times \Sigma_1^n D(i) - W4 \times P \quad \text{(Eqn. 1)}.$$

In Eqn. 1, R is the charging objective value associated with the charging objective of maximizing revenue or profit of the charging service provider. C(i) is the charging objective value associated with the charging objective of minimizing customer costs for charging services, i identifies a specific electric vehicle, n is the number of electric vehicles being charged. D(i) is the charging objective value associated with the charging objective of minimizing battery degradation from charging. P is the charging objective value associated with the charging objective of minimizing a monetary penalty paid by a charging service provider for exceeding the grid capacity. These are merely some values associated with some example charging objectives, and other charging objectives may be used.

Eqn. 2 below describes a calculation for determining R, which is the charging objective value associated with the charging objective of maximizing revenue or profit of the charging service provider, according to one example implementation.

$$R = \sum_{i=1}^{\#\,cars} \sum_{t \in T} (\text{charge}(i, t) \times (price_{cust}(i, t) - price_{proc}(t))) \quad \text{(Eqn. 2)}$$

According to this example, the charging service provider profit is determined by the difference between the sales price, $price_{cust}(i, t)$, and the procurement (or wholesale) cost, $price_{proc}(t)$, of the charging power, multiplied by the amount of charge provided to each car, calculated over all cars i, and over the time interval T. Each time interval T may correspond to the scheduled times for charging for each car, and the sales price and procurement cost amounts are for those specific charge times as provided in the corresponding schedule, e.g., scheduled charge times.

Thus, based on Eqn. 2, the charging objective value R associated with the profit of the charging service provider may be calculated for each electric charging schedule. A charging schedule may specify, for example, times of charging, and either fixed or time varying charge amounts (or charge curves) for each of one or more vehicles. The charge procurement costs and sales price for each time period and for each customer or vehicle may be known or determined by the charging controller 110. For example, the sales prices for charge for each customer may be stored in memory 111, or may be determined dynamically based on time varying procurement costs. As an illustration, charge sales prices for one customer may be dynamically determined, or may vary, as charge procurement cost×1.15, according to one very simple example. Thus, for such a customer, charge sales price may vary in proportion to the charge procurement costs. For example, a time varying procurement cost for charge or power may be received by charging controller 110 from the power grid operator via line 115. However, a sales price for charge or power may be a fixed value for another customer. Therefore, the profit, or the charging objective value R associated with the maximizing the charging service provider's profit, may be determined for each charging schedule based on Eqn. 2, according to one example implementation.

Also, the fitness value for the charge schedule will increase as R increases. A larger weight W1 (compared to the other weights) should be selected if profit of the charging service provider is an important objective in determining a charging schedule, since a larger weight W1 may typically result in the profit (R) term of Eqn. 1 dominating the fitness value. Where a relatively large weight W1 is selected, which would emphasize profit as a charging objective, this may typically result in those charging schedules having higher profit (higher R values) being selected based on a higher resulting fitness value for such schedules. On the other hand, if profit of the charging service provider is not important, then weight W1 may be set to zero (or to a very low value), so that profit of the charging service provider will not be emphasized as an objective, and profit will not impact the fitness value, and thus, charging service provider profit will not impact the selection of charging schedules. In such a case, other charging objective values, associated with other charging objectives, may be emphasized through selecting larger weights for W2, W3, W4, etc. associated with these other objectives. Once a set of weights, e.g., W1, W2, W3, W4, etc., has been selected, these set of weights are typically used in Eqn. 1 to calculate a fitness value for each of the different charging schedules. Thus, each of the schedules will have a different set of charging objective values, and a common set of weights will be applied or used for all of the charging schedules.

In one example, charge procurement may occur on two different markets. In a first market, large amounts of base power load (usage) may be traded for securing long-term supply of power in response to a determined base power demand. In a second market, smaller and short-term power loads may be traded or obtained, possibly at real-time prices. The cost of transactions and the price for the purchased amounts of energy may determine the service provider's procurement costs, according to one example implementation.

Eqn. 3 below describes a calculation for determining C, which is the charging objective value associated with the charging objective of minimizing customer (or consumer) charging cost, according to one example implementation.

$$C(i) = \sum_{i \in T} (charge(i, t) \times price_{cust}(i, t)) \quad \text{(Eqn. 3)}$$

The total cost of charging for consumer is shown by Eqn. 3, and is the sum of charge*price products, where each product is the charge provided to customer or vehicle multiplied by the sales price for that time t, over the period T. Thus, the total cost for charging vehicles for a charging schedule is the sum of charging costs for all vehicles on the charging schedule. The amount of charge and the customer sales price for charge or power may vary over time and may vary from customer to customer. The varying sales price may be known (e.g., a fixed value, stored in memory 111 for each customer), or may be determined by charging controller 110 based on the time varying procurement cost, for example.

In one example implementation, using real-time prices in an unsupervised environment like vehicle battery charging may not be possible in some cases where consumer protection legislation may prohibit dynamically varying prices for power. In such cases, pricing information may be provided to the consumer or customer in advance. This may provide the customer the opportunity to decline the offer and maybe switch to a different electric charging offer, such as a fixed price price option for electric charging. Since short-term trading may be possible during the charging process, the charging service provider may use a price forecast to provide the customer with a charging price before the charging process starts, for example.

With Reference to Eqn. 1, by setting W2 (associated with the charging objective value C for minimizing customer cost), fitness values may be higher for those charging schedules having a lower customer cost. Thus, in this manner, by emphasizing customer cost by increasing a weight W2 associated with customer cost, a charging schedule is more likely to be selected that would result in lower charging costs for customers.

Minimizing a customer's cost C for charging may be a charging objective that is in conflict with the charging objective of maximizing profit R of a charging service provider. Therefore, according to one example implementation, either W1 (associated with service provider profit) may be set to emphasize profit, or W2 (associated with the charging objective value C for consumer cost) may be set to emphasize customer cost. For this reason, usually one of these objectives is selected or emphasized via weight selection, but typically not both of these charging objectives. Thus, a public charging service provider may typically select a substantial non-zero value for weight W1 to emphasize profit R while setting W2 to zero. While, on the other hand, a private charging service provider may set W1 (associated with the objective of maximizing service provider profit) to zero and set weight W2 (associated with the objective of minimizing customer cost) to a non-zero value, for example, to emphasize the objective of minimizing customer cost for vehicle charging.

According to an example implementation, different types of batteries may have certain limitations or constraints which may be taken into account by the charging controller 110 when selecting a charging schedule. For example: 1) each battery may have a maximum charge current that may be applied to the battery during charging without damaging or degrading the battery; 2) each battery may have a minimum operational charge level that should be reached when charging a battery, e.g., to avoid battery degradation and/or to allow for proper operation of the vehicle; and 3) whether or not intermittent (or interrupted) charging may be used to charge a battery. If intermittent charging is not allowed by a battery, then only continuous charging may typically be scheduled for such a battery. Each of these battery limitations or constraints may, for example, be stored in memory 136 of each vehicle, and may be received by charging controller 110 when a vehicle is connected to a charging station, for example.

Eqn. 4 describes a calculation for determining D, which is the charging objective value associated with the charging objective of minimizing battery degradation caused by charging the battery, according to one example implementation.

$$D(i) = \sum_{c \in C} f_{charge}(c) \times \text{charge}(c) + f_{disc} \times n \quad \text{(Eqn. 4)}$$

According to one example implementation, as noted above, there may be different adverse influences on battery lifetime or battery performance, including discontinuous charging, and an amount of current used for battery charging. Intermittent or discontinuous battery charging may degrade a battery performance or decrease a battery lifetime, especially if the battery is not designed to allow intermittent or discontinuous charging. Intermittent or discontinuous charging may include, for example, charging without reaching a minimum charge level, stopping charging, and later resuming charging to reach the minimum charge level. In addition, less battery degradation typically occurs when charging using lower current amounts, and higher battery degradation may typically occur when using higher charging currents, for example.

With reference to Eqn. 4, the total degradation for a battery may be the degradation due to using a specific charge current plus degradation due to discontinuous charging. As shown in Eqn. 4, $f_{charge}(c)$ is the degradation factor of the battery when charged with charge current amount c. Also, $f_{disc}$ is the degradation factor of a battery due to discontinuous charging and n is the number of times that charging has been stopped and restarted, for example. Thus, in this manner, R may represent the total battery degradation. A weight W3 may be set to emphasize or de-emphasize battery degradation as a factor in selecting a charging schedule. A relatively large weight W3 (relative to the other weights) may be set to allow the charging objective of minimizing battery degradation to be an important factor in selecting a charging schedule, since this will result in schedules having a higher battery degradation having a lower fitness value, and schedules having low degradation having significantly higher fitness values.

For example, the degradation factors $f_{charge}(c)$ and $f_{disc}$ may be stored in memory 136 of the vehicle and provided to charging controller 110 when the vehicle 118 is connected to a charging station 116. The number of charging discontinuities or number of charging starts and stops, and the amount of charge or current used for charging may typically be identified by each charging schedule. Therefore, charging controller 110 can calculate the D, the charging objective value associated with minimizing battery degradation, based on Eqn. 4, and then use this value D to calculate a fitness value for the charging schedule.

Eqn. 5 describes a calculation for determining P or the Penalty, which is the charging objective value associated with the charging objective of minimizing the monetary penalty for the charging service provider exceeding the grid capacity for the provider's system, according to an example implementation.

$$\text{Penalty} = \Sigma P(i,t) - \text{Grid capacity}(t) \quad \text{(Eqn. 5)}$$

In Eqn. 5, the monetary penalty is the sum of all charging power P(i, t) applied to all vehicles i minus the grid capacity, for any time t. Thus, a non-zero monetary penalty will occur whenever total power used for charging vehicles exceeds the grid capacity at any time t. Although not shown in Eqn. 5, a negative penalty is not possible, since no penalty would apply where the total charging power is less than the grid capacity. A weight W4 may be used to emphasize or de-emphasize the electric charging objective of minimizing the monetary penalty associated with exceeding the grid capacity.

Figure 2:
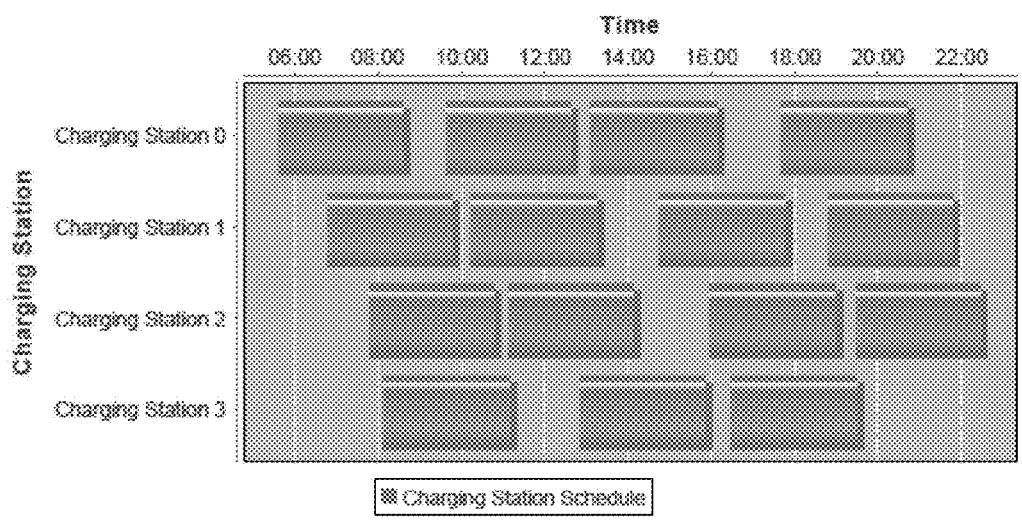
FIG. 2 is a diagram illustrating an electric charging schedule according to an illustrative example.

FIG. 2 is a diagram illustrating an electric charging schedule according to an illustrative example. Charging times are shown for different charging stations, including for charging stations 0, 1, 2, and 3. A different electric vehicle may receive a continuous charge as shown by the different charge blocks for each charging station. Although not shown, a charging schedule may also typically identify a charge current or charge curve, which may identify a time varying charge current for each vehicle or charging station.

Figure 3:
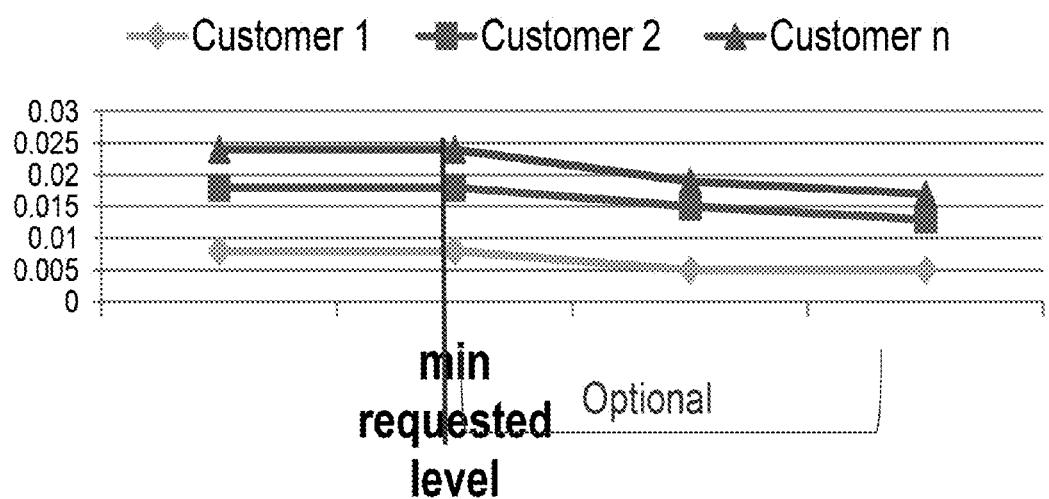
FIG. 3. is a diagram illustrating a customer cost for different charge amounts for different customers according to an example implementation.

FIG. 3. is a diagram illustrating a customer cost for different charge amounts for different customers according to an example implementation. Cost in dollars for a unit of energy (e.g., Watthour) or charge is shown in the vertical axis, ranging from $0.0 up to $0.03. The horizontal axis shows the amount of charge received by each of customer 1, customer 2 and customer 3. In this example, each customer may receive a minimum requested charge amount for a first price, and may request an optional additional charge amount for an additional price that is lower than the first price. For example, customer 1 may initially receive a minimum charge amount for $0.01 per unit charge or energy, and for a decreasing charge that levels out at about $0.005 per unit charge for any charge provided that is greater than the minimum requested level of charge. Note that different customers may be charged different charge costs, and the charge amounts may change differently for different customers beyond the minimum requested level of charge, for example.

Figure 4:
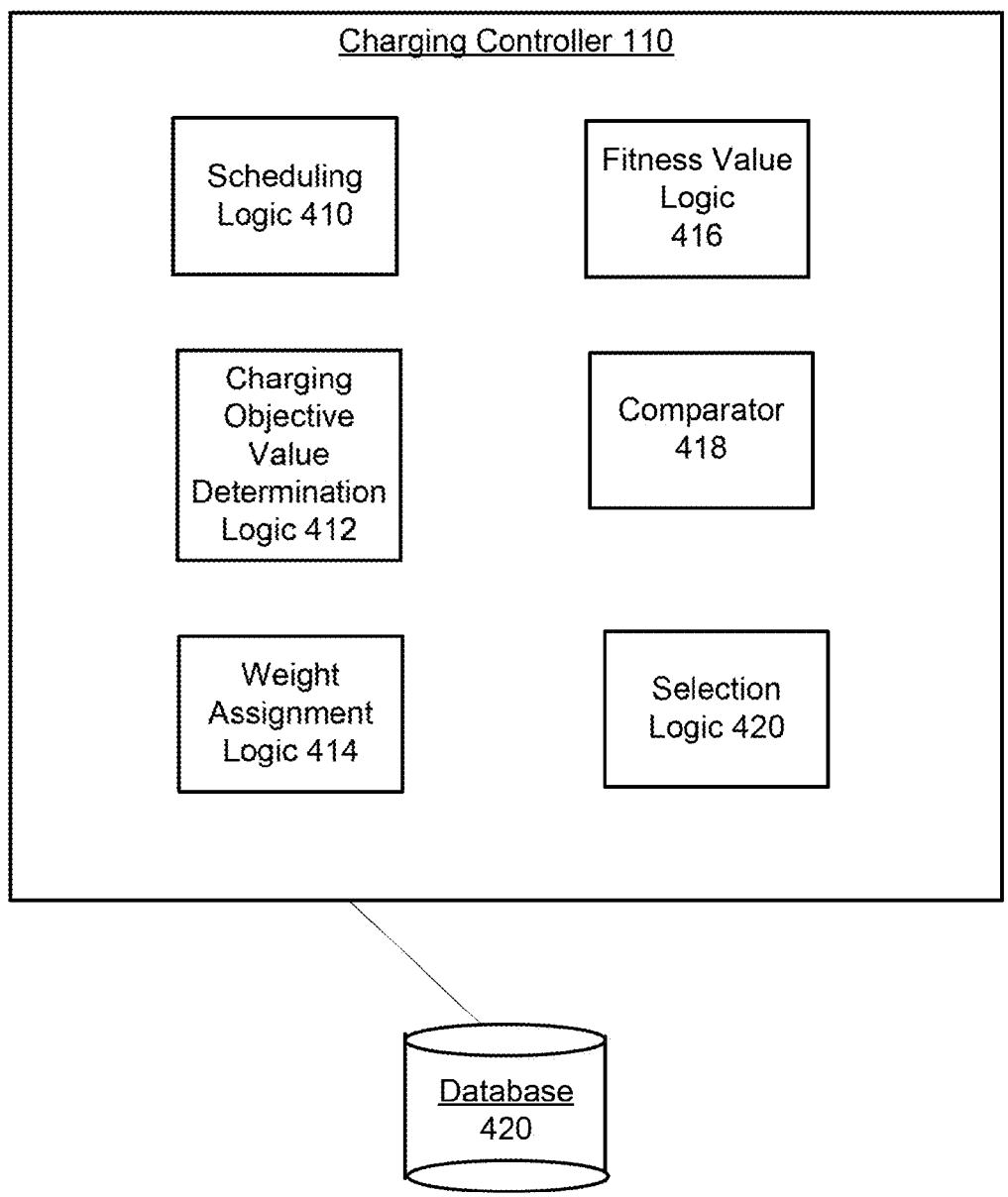
FIG. 4 is a block diagram illustrating a charging controller according to an example implementation.

FIG. 4 is a block diagram illustrating a charging controller according to an example implementation. A scheduling logic 410 is configured to determine a plurality of electric charging schedules for one or more electric vehicles. A charging objective value determination logic 412 is configured to determine, for each of the electric charging schedules, a plurality of charging objective values. A weight assignment logic 414 is configured to assigning a weight to each of the charging objective values, wherein one set of weights is used for the plurality of electric charging schedules. A fitness value logic 416 is configured to calculate a fitness value for each of the electric charging schedules based on the plurality of charging objective values for each respective electric charging schedule and the set of weights. A comparator 418 is configured to identify the electric charging schedule having a highest fitness value, e.g., by comparison of the fitness values of the plurality of charging schedules to identify the highest fitness value. Selection logic 420 is configured to select the electric charging schedule having the highest fitness value for charging one or more electric vehicles.

Figure 5:
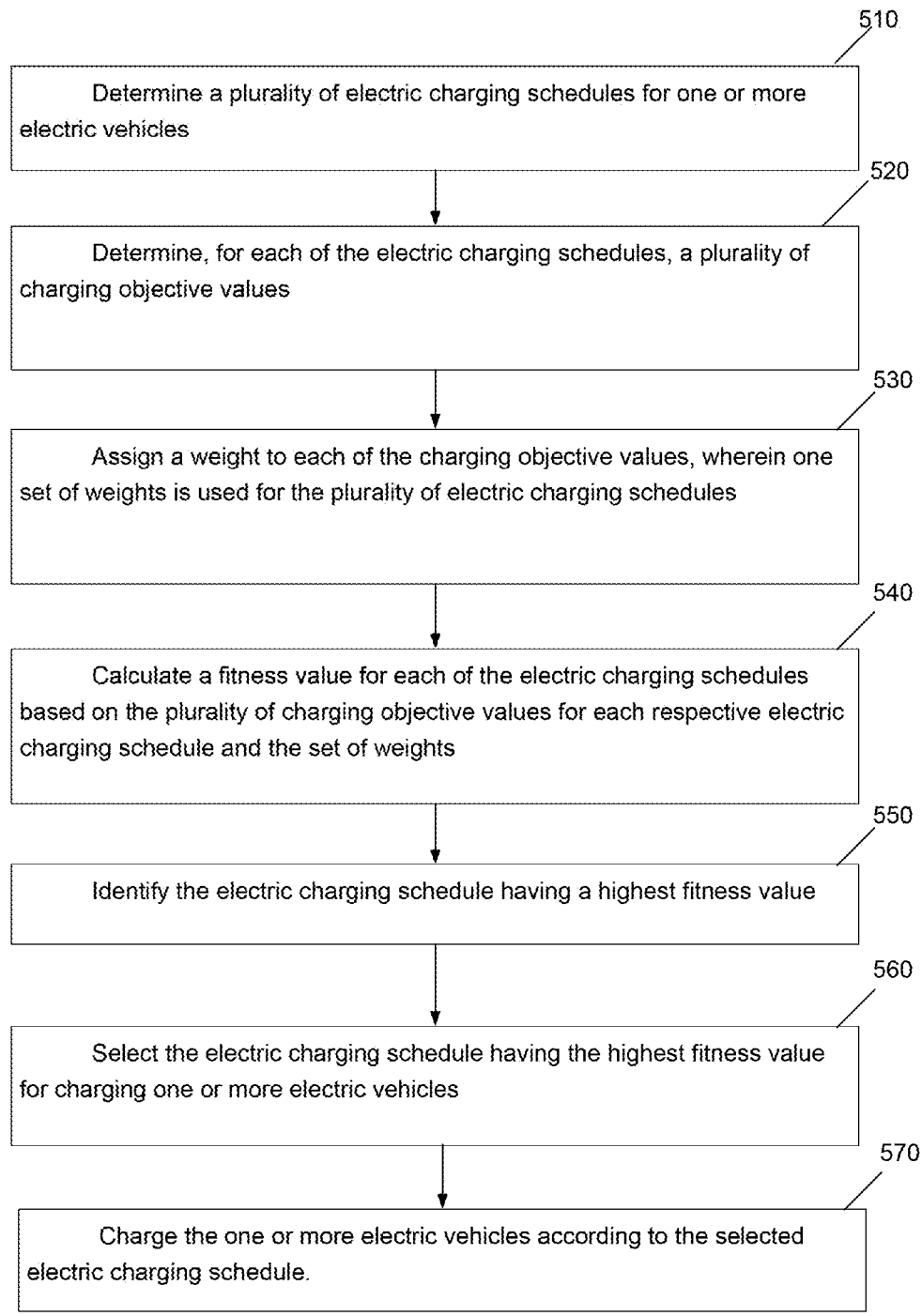
FIG. 5 is a flow chart illustrating an operation of a charging controller according to an example implementation.

FIG. 5 is a flow chart illustrating an operation of a charging controller according to an example implementation. At 510, a plurality of electric charging schedules are determined for one or more electric vehicles. At 520, a plurality of charging objective values are determined for each of the electric charging schedules. At 530, a weight is assigned to each of the charging objective values, wherein one set of weights is used for the plurality of electric charging schedules. At 540, a fitness value is calculated for each of the electric charging schedules based on the plurality of charging objective values for each respective electric charging schedule and the set of weights. At 550, the electric charging schedule is identified that has a highest fitness value. At 560, the electric charging schedule having the highest fitness value is selected for charging one or more electric vehicles. At 570, the one or more electric vehicles are charged by a charging system according to the selected electric charging schedule.

Figure 6:
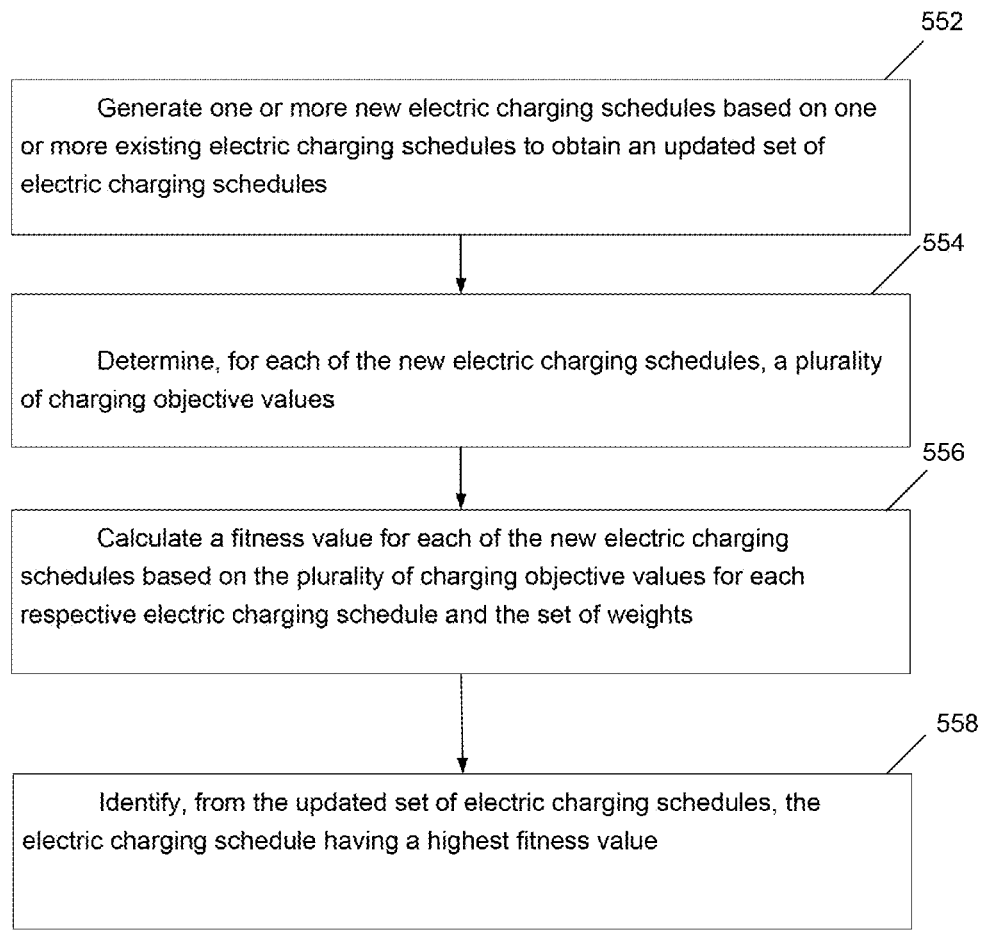
FIG. 6 is a flow chart illustrating a technique for identifying a charging schedule having a highest fitness value according to an example implementation.

FIG. 6 is a flow chart illustrating a technique for identifying a charging schedule having a highest fitness value according to an example implementation. Operations 552, 554, 556 and 558 illustrate example operations that may be performed to perform operation 550 shown in the flow chart of FIG. 5, according to an example implementation. At 552, one or more new electric charging schedules are generated based on one or more existing electric charging schedules to obtain an updated set of electric charging schedules. At 554, a plurality of charging objective values are determined for each of the new electric charging schedules. At 556, a fitness value is calculated for each of the new electric charging schedules based on the plurality of charging objective values for each respective electric charging schedule and the set of weights. At 558, the electric charging schedule having a highest fitness value is identified from the updated set of electric charging schedules.

According to an example implementation, one or more charging schedules may be established or initialized, based on one or more system inputs and user inputs, constraints and other information. In one example implementation, an initial set of charging schedules may be selected randomly, e.g., start and end times, and charge currents may initially selected randomly, but within certain constraints. Weights are assigned by a user or administrator and received by charging controller 110, with a set of weights, W1, W2, W3, ... WN being applied to all of the charging schedules. A plurality of charging objective values are determined for each charging schedule. A fitness value is determined for each charging schedule based on the charging objective values for each schedule and the associated weights. A charging schedule may be identified that has a highest fitness value, as this schedule may best fit the charging objectives as identified by the weights. The charging schedule having the highest fitness value is then selected for charging one or more electric vehicles. A charging system may then charge the one or more vehicles according to the selected charging schedule.

The charging schedules may be improved, e.g., by using evolutionary optimization, or other technique, to generate a new set of electric charging schedules based on one or more existing charging schedules. For example, an improved set of schedules may be generated based on a set of N schedules having the N highest fitness values. The schedule having a highest fitness value is then selected from the new and existing charging schedules. This process of generating one or more new schedules based on one or more existing schedules, calculating a fitness value for each of the new schedules, and then re-selecting the schedule having the highest fitness value may be repeated to further improve the set of charging schedules. In this manner, each iteration may, at least in some cases, result in one or more new charging schedules that may be better or have a higher fitness value, than the existing set of charging schedules. In this manner, the set of charging schedules may evolve or improve over time, for a given set of weights. If any of the parameters changes, such as an additional vehicle is added for charging, a weight is changed, a procurement cost or charge price changes, etc., then the charging objective values and fitness values are recalculated for each of the schedules and evolutionary improvement process begins again, for example.

According to an example implementation, a new charging schedule may be generated by changing a charging start time, end time and/or charge current level or charge curve of an existing charging schedule to generate a new charging schedule.

In another example implementation, a new charging schedule may be generated based on a recombination of portions of at least two existing charging schedules. For example:
Schedule A: Car (or vehicle) 1: 2 pm (charging start time)
Car 2: 5 pm (charging start time)
Schedule B: Car 1: 3 pm (charging start time)
Car 2: 6 pm (charging start time)

In this example, a new schedule may be generated based on a recombination of portions of schedule A and B. The new schedule (schedule C) may include the car 1 2 pm start time from schedule A, and the car 2 6 pm start time from schedule B. This is merely an example, of how a new schedule may be generated from two existing schedules based on a recombination operator.

According to another example implementation, a new charging schedule may be generated based on a mutation or modification of an existing schedule. For example, schedule A may be:
Schedule A: car 1-2 pm start time (change to 1 pm to generate new schedule).
Car 2-5 pm start time.

In this example, schedule A may be modified by changing the 2 pm start time for car 1 to 1 pm, for the new charging schedule. This new or modified charging schedule may happen to provide an improved (higher fitness value) charging schedule based on a received set of weights, for example.

According to another example implementation, a new charging schedule may be generated based on a bomb operator, or a destroy and rebuild operator. In this example, a portion of the schedule, which occurs around an identified time, is deleted or destroyed and is rebuilt. For example, any charging times scheduled within ½ hour of a particular time, e.g., 1:30 pm, may be deleted and reset to new values. Thus, an existing schedule that identifies a charging start time for car (or vehicle) 1 at 2 pm would have that entry in the schedule deleted and the charging start time for car 1 might be reset to a new value, e.g., 4 pm, for example.

These are merely a few example operators that may be used to generate a new charging schedule based on one or more existing schedules, and other techniques or operators may be used.

EXAMPLES

According to a very simple example, the charging objective values and other parameters may be: (n=2, meaning there are two vehicles being charged); R=13, C(1)=9, C(2)=8, D(1)=15, D(2)=11, P=3.

The Fitness value depends on the weights applied to these values. In a first example, weights (W1, W2, W3, W4)=(30, 10, 0, 60). This example choice of weights puts heavy weight on the penalty for exceeding grid capacity and also on the revenue/profits of the charging service provider, but little on customers' cost and none on the degradation of batteries. It might be a useful choice of weights for a company car park, where the grid installation is fragile and the batteries used in the cars are very advanced and don't suffer from degradation. For simplicity, the weights add up to 100, but this is not necessary, and any values may be chosen, since it is the relative fitness values, or fitness values of schedules compared to fitness values of other schedules for a same set of weights that is used to select a schedule.

The resulting fitness value for this first example is therefore:

$$\text{Fitness value}=30*13-10*(9+8)-0*(15+11)-60*3=390-170-0-180=40.$$

If this is a "good" fitness value or not depends on the other solutions in the population, e.g., the fitness values for other schedules. For example, the fitness value itself does not necessarily mean something by itself, but it does allow comparison to fitness values of other schedules where fitness values were calculated using the same set of weights. This is because the charging controller 110 is identifying a best or most suitable charging schedule, which may be the schedule having the highest fitness value for this set of weights.

In a second example, the weights might be chosen differently, e.g., to emphasize different charging objectives. In this second example, a set of weights (W1, W2, W3, W4)=(30, 30, 20, 20) may be used, which means that revenue/profit and customers' costs are weighted equally, and battery degradation and grid capacity are included to a limited amount, the Fitness value amounts to:

$$\text{Fitness}=30*13-30*(9+8)-20*(15+11)-20*3=390-510-520-60=-700.$$

The schedule of the first example is not better than the schedule of the second example, since these fitness values that used different weights. The fitness value of the schedule in this second example would be compared to fitness values of other schedules based on a same set of weights.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program described above, can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Methods also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Thus, while certain features of the described implementations have been illustrated as described herein, many modifications, substitutions, changes and equivalents will now occur to those skilled in the art. It is, therefore, to be understood that the appended claims are intended to cover all such modifications and changes.

What is claimed is:

1. A computer program product, the computer program product being tangibly embodied on a non-transitory, computer-readable storage medium and including executable code that, when executed, is configured to cause at least one data processing apparatus to: determine a plurality of electric charging schedules for one or more electric vehicles; determine, for each of the electric charging schedules, a plurality of charging objective values; assign a weight to each of the charging objective values, wherein one set of weights is used for the plurality of electric charging schedules; calculate a fitness value for each of the electric charging schedules based on the plurality of charging objective values for each respective electric charging schedule and the set of weights; identify the electric charging schedule having a highest fitness value; and select the electric charging schedule having the highest fitness value for charging one or more electric vehicles.

2. The computer program product of claim 1 and wherein the code being further configured to cause the at least one data processing apparatus to control a charging system to charge the one or more electric vehicles according to the selected electric charging schedule.

3. The computer program product of claim 1 and wherein the code being further configured to cause the at least one data processing apparatus to use evolutionary optimization to generate a new set of electric charging schedules based on one or more existing charging schedules, and then selecting the electric charging schedule having a highest fitness value from the new and existing electric charging schedules.

4. The computer program product of claim 1 wherein the code being configured to cause the at least one data processing apparatus to identify the electric charging schedule having a highest fitness value comprises the code being configured to cause the at least one data processing apparatus to use evolutionary optimization to generate an improved set of N electric charging schedules, and identify, from the improved set of electric charging schedules, the electric charging schedule having a highest fitness value.

5. The computer program product of claim 1 wherein the code being configured to cause the at least one data processing apparatus to identify the electric charging schedule having a highest fitness value comprises the code being configured to cause the at least one data processing apparatus to:

generate one or more new electric charging schedules based on one or more existing electric charging schedules to obtain an updated set of electric charging schedules;

determine, for each of the new electric charging schedules, a plurality of charging objective values;

calculate a fitness value for each of the new electric charging schedules based on the plurality of charging objective values for each respective electric charging schedule and the set of weights; and identify, from the updated set of electric charging schedules, the electric charging schedule having a highest fitness value.

6. The computer program product of claim 1 wherein the fitness value for each charging schedule is calculated as a sum or linear aggregation of weighted charging objective values, where each charging objective value is multiplied by an associated weight.

7. The computer program product of claim 1 and wherein the code being further configured to cause the at least one data processing apparatus to receive the plurality of the weights from a user or administrator.

8. The computer program product of claim 1 and wherein the code being further configured to cause the at least one data processing apparatus to receive a plurality of user charging preferences comprising a charging end time or vehicle departure time, and a requested charge amount.

9. The computer program product of claim 1 wherein the charging objective values comprise values associated with charging objectives including at least:
revenue of a charging service provider;
customer cost for charging a customer's electric vehicle; and
battery degradation caused by charging the battery of the electric vehicle.

10. The computer program product of claim 1 wherein the code being configured to cause the at least one data processing apparatus to determine a plurality of electric charging schedules comprises the code being configured to cause the at least one data processing apparatus to generate a plurality of electric charging schedules that meet one or more system constraints and one or more user preferences;
wherein the system constraints include a power grid capacity and a maximum charge current or charge curve for each of one or more electric vehicles or batteries to be charged;
wherein the one or more user preferences include a charging end time or vehicle departure time, and a requested charge amount, for each of one or more electric vehicles.

11. The computer program product of claim 1 and wherein the code being further configured to cause the at least one data processing apparatus to generate a new electric charging schedule by changing a charging start time and/or changing a charging current value or charging curve of an existing electric charging schedule to obtain a new electric charging schedule.

12. The computer program product of claim 1 and wherein the code being further configured to cause the at least one data processing apparatus to generate a new electric charging schedule based on a recombination of portions of at least two existing electric charging schedules.

13. The computer program product of claim 1 and wherein the code being further configured to cause the at least one data processing apparatus to generate a new electric charging schedule based on a mutation or modification of an existing electric charging schedule.

14. The computer program product of claim 1 and wherein the code being further configured to cause the at least one data processing apparatus to generate a new electric charging schedule based on deleting a portion of an existing charging schedule, and reconstructing the deleted portion with one or more new schedule values.

15. A computer implemented method performed by a processor, the method comprising:
determining a plurality of electric charging schedules for one or more electric vehicles;
determining, for each of the electric charging schedules, a plurality of charging objective values;
assigning a weight to each of the charging objective values, wherein one set of weights is used for the plurality of electric charging schedules;
calculating a fitness value for each of the electric charging schedules based on the plurality of charging objective values for each respective electric charging schedule and the set of weights;
identifying the electric charging schedule having a highest fitness value; and
selecting the electric charging schedule having the highest fitness value for charging one or more electric vehicles.

16. The computer implemented method of claim 15 and further comprising charging, by a charging system, the one or more electric vehicles according to the selected electric charging schedule.

17. The computer implemented method of claim 15 and further comprising receiving user inputs including a charging end time or vehicle departure time and a requested charge amount, and one or more battery-specific constraints.

18. The computer implemented method of claim 15 and further comprising receiving, via communication from a vehicle, one or more battery constraints or parameters, including one or more of a minimum or maximum battery charge amount, and a maximum battery charge current.

19. An apparatus comprising:
scheduling logic configured to determine a plurality of electric charging schedules for one or more electric vehicles;
charging objective value determination logic configured to determine, for each of the electric charging schedules, a plurality of charging objective values;
weight assignment logic configured to assigning a weight to each of the charging objective values, wherein one set of weights is used for the plurality of electric charging schedules;
fitness value logic configured to calculate a fitness value for each of the electric charging schedules based on the plurality of charging objective values for each respective electric charging schedule and the set of weights;
a comparator configured to identify the electric charging schedule having a highest fitness value; and
selection logic configured to select the electric charging schedule having the highest fitness value for charging one or more electric vehicles.

20. The apparatus of claim 19 and further comprising an electric charging system configured to charge the one or more electric vehicles according to the electric charging schedule that has the highest fitness value.

* * * * *